United States Patent [19]
Howe et al.

[11] 3,852,468
[45] Dec. 3, 1974

[54] ALKANOLAMINE DERIVATIVES AS β-ADRENERGIC BLOCKING AGENTS

[75] Inventors: Ralph Howe; Leslie Harold Smith, both of Macclesfield, England

[73] Assignee: Imperial Chemical Industrial Limited, London, England

[22] Filed: Nov. 6, 1970

[21] Appl. No.: 87,651

Related U.S. Application Data

[63] Continuation-in-part of Ser. Nos. 618,994, Feb. 27, 1967, abandoned, and Ser. No. 675,295, Oct. 16, 1967, Pat. No. 3,562,297, and Ser. No. 677,027, Oct. 23, 1967, Pat. No. 3,574,749, and Ser. No. 754,456, Aug. 21, 1968, Pat. No. 3,634,511, and Ser. No. 760,999, Sept. 19, 1968, Pat. No. 3,712,927, which is a continuation-in-part of Ser. No. 488,252, Sept. 17, 1965.

[30] Foreign Application Priority Data

Sept. 30, 1964 Great Britain .................... 29774/64

[52] U.S. Cl................. 424/324, 424/272, 424/285, 424/300, 424/304, 424/321, 424/330, 260/562 A

[51] Int. Cl. ............................................ A61k 27/00
[58] Field of Search .................... 424/324, 304, 330; 260/562

[56] References Cited
UNITED STATES PATENTS
2,830,008    4/1958    Barber et al. ...................... 424/324

Primary Examiner—Vincent D. Turner
Attorney, Agent, or Firm—Cushman, Darby & Cushman

[57] ABSTRACT

A pharmaceutical composition containing as active ingredient a 1-acylaminophenoxy-3-amino-2-propanol derivative which possesses β-adrenergic blocking activity, and methods for using such derivatives to produce coronary β-adrenergic blockade and to treat heart diseases, hypertension and phaeochromocytoma in warm-blooded animals including man. The derivatives may also be used together with a sympathomimetic bronchodilator in the treatment of asthma. Representative of the derivatives used is 1-(4-acetamidophenoxy)-3-isopropylamino-2-propanol.

15 Claims, No Drawings

ALKANOLAMINE DERIVATIVES AS β-ADRENERGIC BLOCKING AGENTS

This application is a continuation-in-part of applications Ser. Nos. 618,994, filed 2,27,67 now abandoned (itself a continuation-in-part of Ser. No. 488,252, filed 9,17,65 now U.S. Pat. No. 3,408,387); Ser. No. 675,295, filed 10,16,67 (now U.S. Pat. No. 3,562,297); Ser. No. 677,027 filed 10,23,67 (now U.S. Pat. No. 3,574,749); Ser. No. 754,456, filed 8,21,68, (now U.S. Pat. No. 3,634,511) and Ser. No. 760,999 filed 9,19,69 (now U.S. Pat. No. 3,712,927).

This invention relates to a pharmaceutical composition which contains as active ingredient at least one alkanolamine derivative which possesses β-adrenergic blocking activity in warm-blooded animals such as cats and other experimental animals, and which also possesses β-adrenergic blocking activity in humans, and which composition is therefore of value in the treatment of humans or other hosts needing such activity. Representative of the uses contemplated are the treatment or prophylaxis of heart diseases, for example angina pectoris and cardiac arrhythmias, and the treatment of hypertension and phaeochromocytoma, in man.

According to the invention there is provided a pharmaceutical composition which contains as active ingredient at least one alkanolamine derivative selected from the group consisting of compounds of the formula:

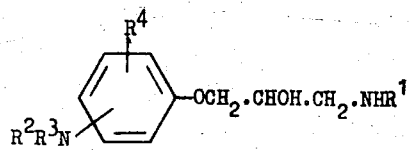

wherein $R^1$ is unsubstituted alkyl of up to 10 carbon atoms, or unsubstituted cycloalkyl of up to 8 carbon atoms, or alkyl of up to 6 carbon atoms which is substituted by hydroxy, phenyl, halogenophenyl or alkoxyphenyl; wherein $R^2$ is hydrogen or alkyl of up to 4 carbon atoms; wherein $R^3$ is acyl of up to 10 carbon atoms; and wherein $R^4$ is hydrogen, halogen, hydroxy, nitro, cyano, acetamido or trifluoromethyl, or alkyl, alkoxyalkyl, phenylalkyl, phenylalkoxy, aryl or aryloxy each of up to 10 carbon atoms, or cycloalkyl of up to 8 carbon atoms, or hydroxyalkyl, alkoxy, alkenyloxy, alkynyloxy, alkenyl, alkylthio, alkanoyl or alkoxycarbonyl each of up to 5 carbon atoms; and the esters thereof with a saturated or unsaturated aliphatic carboxylic acid of up to 20 carbon atoms or with an aromatic carboxylic acid of up to 10 carbon atoms; and the condensation products thereof with an aldehyde of the formula $R^5$.CHO, wherein $R^5$ is hydrogen or alkyl of up to 4 carbon atoms; and the non-toxic, pharmaceutically-acceptable acid-addition salts, thereof; said active ingredient being associated with a non-toxic, pharmaceutically acceptable diluent or carrier therefor.

It is to be understood that the above definition of alkanolamine derivatives encompasses all possible stereoisomers thereof, and mixtures thereof, including racemic compounds and optically active enantiomers. It is believed, however, that β-adrenergic blocking activity predominates in the optically active enantiomer which has the R absolute configuration.

The substituent of $R^1$ is preferably alkyl of 3,4 or 5 carbon atoms which is branched at the α-carbon atom, that is, the carbon atom adjacent to the nitrogen atom, and which is unsubstituted or which bears one hydroxy or phenyl substituent attached to a carbon atom other than the α-carbon atom.

$R^1$ may be, for example, isopropyl, s-butyl, t-butyl, cyclopropyl, cyclobutyl, cyclopentyl, 2-hydroxy-1,1-dimethylethyl, 1,1-dimethyl-2-phenylethyl, 1-methyl-2-phenylethyl, 1-methyl-3-phenylpropyl or 1-methyl-2-(p-methoxyphenyl)ethyl. A preferred value for $R^1$ is isopropyl or t-butyl.

$R^2$ may be, for example, hydrogen or methyl.

$R^3$ may be acyl derived from a carboxylic acid or from a sulphonic acid. It may be, for example, alkanoyl of up to 10 carbon atoms, for example formyl, acetyl, propionyl, butyryl, isobutyryl, valeryl, pivaloyl, hexanoyl, heptanoyl or decanoyl; hydroxyalkanoyl, halogenoalkanoyl, alkenoyl, alkoxycarbonyl or alkanesulphonyl each of up to 6 carbon atoms, for example hydroxyacetyl, chloroacetyl, acryloyl, crotonoyl, ethoxycarbonyl, methanesulphonyl or ethanesulphonyl; cycloalkanecarbonyl of up to 8 carbon atoms, for example cyclopropanecarbonyl or cyclohexanecarbonyl; phenylalkanoyl, phenoxyalkanoyl or phenylalkenoyl each of up to 10 carbon atoms, for example phenylacetyl, phenoxyacetyl or cinnamoyl; benzoyl or substituted benzoyl, for example halogenobenzoyl or nitrobenzoyl, or alkylbenzoyl or acylaminobenzoyl each of up to 12 carbon atoms, for example o-chlorobenzoyl, p-chlorobenzoyl, m-nitrobenzoyl, p-toluoyl, p-t-butylbenzoyl or p-acetamidobenzoyl; furoyl, for example 2-furoyl; or benzenesulphonyl or substituted benzenesulphonyl, for example alkylbenzenesulphonyl of up to 10 carbon atoms, for example toluene-p-sulphonyl.

$R^4$ may be, for example, hydrogen, fluorine, chlorine, bromine, iodine, hydroxy, nitro, cyano, acetamido, trifluoromethyl, methyl, ethyl, n-propyl, isopropyl, n-butyl, isobutyl, s-butyl, t-butyl, t-pentyl, 1-methylheptyl, methoxymethyl, benzyl, α-methylbenzyl, benzyloxy, phenyl, p-tolyl, phenoxy, p-tolyloxy, cyclohexyl, hydroxymethyl, methoxy, ethoxy, allyloxy, propargyloxy, allyl, methylthio, ethylthio, acetyl, propionyl, methoxycarbonyl or ethoxycarbonyl.

$R^5$ may be, for example, hydrogen or isopropyl.

Esters of the alkanolamine derivatives may be derived, for example, from acetic, hexanoic, palmitic, stearic, oleic or benzoic acid.

Suitable non-toxic, pharmaceutically acceptable salts of the alkanolamine derivatives or of the esters or aldehyde-condensation products thereof are, for example, hydrochlorides, hydrobromides, phosphates, sulphates, oxalates, lactates, tartrates, acetates, salicylates, citrates, benzoates, β-naphthoates, adipates or 1,1-methylene-bis-(2-hydroxy-3-naphthoates) thereof, or salts derived from sulphonated polysytrene resins.

A particularly valuable group of compounds which may be used as active ingredient in the composition of the invention comprises alkanolamine derivatives of the formula:

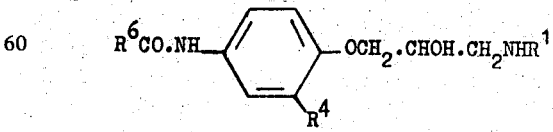

wherein $R^1$ is alkyl of 3,4 or 5 carbon atoms which is branched at the α-carbon atom and which is unsubstituted or which bears one hydroxy or phenyl substituent attached to a carbon atom other than the α-carbon atom, or $R^1$ is cycloalkyl of 3,4 or 5 carbon atoms; wherein $R^4$ has the meaning stated above; and wherein $R^6$ is alkyl of up to 6 carbon atoms, alkenyl of 2 or 3 carbon atoms, chloromethyl, cyclopropyl, benzyl, styryl, phenyl, tolyl or monochlorophenyl, and the acid-addition salts thereof.

The alkanolamine derivatives may be prepared by the reaction of an epoxide or chlorohydrin of the formula:

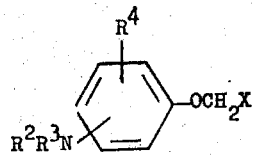

wherein $R^2$, $R^3$ and $R^4$ have the meanings stated above and wherein X is the group

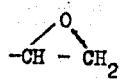

or $-CHOH.CH_2Y$, wherein Y is halogen, for example chlorine or bromine, with an amine of the formula $R^1R^7NH$, wherein $R^1$ has the meaning stated above and $R^7$ is hydrogen or benzyl, whereafter if $R^7$ is benzyl the benzyl group is removed by hydrogenolysis, as generally described in U.S. Pat. Specification No. 3,408,387. Alternatively, the alkanolamine derivatives may be obtained by other methods generally described in the various applications of which this application is a continuation-in-part. The esters and aldehyde-condensation products and salts may be obtained by the reaction of the alkanolamine derivative with, respectively, an acylating agent, an aldehyde of the formula $R^5CHO$, wherein $R^5$ has the meaning stated above, or an acid, as also generally described in U.S. Pat. Specification No. 3,408,387.

The pharmaceutical composition of the invention may be obtained by conventional means using conventional diluents and carriers, and it may be in a form suitable for oral administration, for example in the form of tablet (which may be intended to be swallowed or to be allowed to dissolve sublingually), capsule, aqueous or oily solution or suspension, emulsion, dispersible powder, granule, syrup or elixir; or for parenteral administration, for example in the form of a sterile injectable aqueous or oily solution or suspension; or for rectal administration, as a suppository; or for administration by inhalation, for example in the form of an aerosol, spray or snuff.

Compositions intended for oral use may be prepared according to any method known to the art for the manufacture of orally administrable pharmaceutical compositions, and such compositions may contain one or more agents selected from sweetening agents, for example sucrose, saccharin, glycerol and sorbitol, flavouring agents, for example essential oils, and colouring agents in order to provide an elegant and palatable preparation.

The tablets of the invention contain the active ingredient in admixture with non-toxic pharmaceutical excipients known to be suitable in the manufacture of tablets. Suitable pharmaceutical excipients are, for example, inert diluents, for example calcium carbonate, sodium carbonate, lactose, calcium phosphate or sodium phosphate, granulating and disintegrating agents, for example maize starch or alginic acid, binding agents, for example starch, gelatin or acacia mucilage, and lubricating agents, for example magnesium stearate, stearic acid or talc. The tablets may be uncoated or they may be coated by known techniques to delay disintegration and absorption in the gastro-intestinal tract and thereby provide a sustained action over a longer period.

Formulations for oral use may be presented as hard gelatin capsules containing active ingredient only or containing the active ingredient in admixture with an inert solid diluent, for example lactose, sorbitol, calcium carbonate, calcium phosphate or kaolin, or they may be presented as soft gelatin capsules wherein the active ingredient is mixed with an oily medium, for example arachis oil, liquid paraffin or olive oil.

The aqueous suspensions of the invention contain the active ingredient in admixture with excipients known to be suitable in the manufacture of aqueous suspensions. Suitable excipients are, for example, suspending agents, for example sodium carboxymethylcellulose, methylcellulose, hydroxypropylmethylcellulose, sodium alginate, polyvinylpyrrolidone, gum tragacanth or gum acacia, dispersible or wetting agents, for example naturally occurring phosphatides, for example lecithin, or condensation products of ethylene oxide with fatty acids, for example polyoxyethylene stearate, or condensation products of ethylene oxide with long chain aliphatic alcohols, for example (heptadecaoxyethylene)cetanol or condensation products of ethylene oxide with partial esters derived from fatty acids and a hexitol, for example polyoxyethylene sorbitol monooleate, or condensation products or ethylene oxide with partial esters derived from fatty acids and hexitol anhydrides, for example polyoxyethylene sorbitan mono-oleate.

Oily suspensions may be formulated by suspending the active ingredients in a vegetable oil, for example arachis oil, olive oil, sesame oil or coconut oil, or in a mineral oil, for example liquid paraffin, and the said oily suspensions may contain a thickening agent, for example beeswax, hard paraffin or cetyl alcohol. These compositions may also contain an anti-oxidant, for example propyl gallate or ascorbic acid.

The pharmaceutical composition of the invention may also be in the form of an oil-in-water emulsion in which the oily phase may be a vegetable oil, for example olive oil or arachis oil, or a mineral oil, for example liquid paraffin, or mixtures of these. Suitable emulsifying agents are naturally occurring gums, for example gum acacia or gum tragacanth, naturally occurring phosphatides, for example soya bean lecithin, and esters or partial esters derived from fatty acids and hexitol anhydrides, for example sorbitan mono-oleate, and condensation products of the said partial esters with ethylene oxide, for example polyoxyethylene sorbitan mono-oleate.

Dispersible powders and granules suitable for the extemporaneous preparation of an aqueous suspension by the addition of water contain the active ingredient in admixture with a dispersing or wetting agent, suspending agent and one or more preservatives. Suitable dispersing or wetting agents and suspending agents are those mentioned above in the description of aqueous suspension formulations.

Syrups and elixirs may be formulated with sweetening agents, for example glycerol, sorbitol or sucrose.

Such formulations may also contain a demulcent, a preservative and flavouring and colouring agents.

The pharmaceutical composition of the invention may alternatively be in the form of a suppository intended for administration of the active ingredient per rectum. Such a composition may be prepared by mixing the active ingredient with a suitable non-irritating excipient which is solid at ordinary temperatures but liquid at the rectal temperature and which will therefore melt in the rectum to release the active ingredients. Suitable excipients are cocoa butter and polyethylene glycols.

The inhalation compositions of the invention may be in the form of aqueous solutions of the active ingredient which are to be sprayed into the mouth, or in the form of aerosols consisting of fine particles of the active ingredient having particle size of the order of 2 to 6 $\mu$, suspended in an inert propellant such as dichlorodifluoromethane or dichlorotetrafluoroethane.

The $\beta$-adrenergic blocking effect of the alkanolamine derivatives used as active ingredient in the composition of the invention is measured in terms of the inhibition of isoprenaline-induced tachycardia in cats by the following procedure, which is standard in the art for the measurement of such activity and which is based on the procedure described by Black and Stephenson in The Lancet, August 1962, p.311:

A cat is anaesthetised with chloralose, at a dose of 80 mg./kg. bodyweight given intravenously, and its heart rate and blood pressure are continuously recorded. Isoprenaline [1-(3,4-dihydroxyphenyl)-2-isopropylaminoethanol] is then administered intravenously to the cat at intervals of 10 minutes, at a dose of 0.20 $\mu$g./kg. bodyweight each time. Each injection of isoprenaline causes a transient increase in heart rate (a tachycardia) and a transient fall in blood pressure, and the mean of three increases in heart rate, measured in beats per minute, is termed the control tachycardia. The compound under test is then administered to the cat by continuous intravenous infusion at a given rate (usually in the range between 1 and 10 $\mu$g./kg. bodyweight/minute) for a period of 30 minutes, the heart rate and blood pressure of the cat still being continuously recorded (it being understood that administration of the compound might in itself have some effect on the heart rate and/or blood pressure of the cat). Isoprenaline is again administered intravenously at intervals of 10 minutes at a dose of 0.20 $\mu$ g./kg. bodyweight each time, and the tachycardia caused by the administration of isoprenaline 30 minutes after the beginning of infusion of the test compound is measured (the increase in heart rate being calculated using the heart rate immediately before administration of isoprenaline, and not necessarily that at the beginning of the whole experimental procedure, as the base-line). The difference between this tachycardia and the control tachycardia is then expressed as a percentage of the control tachycardia, this percentage being termed the "percentage inhibition of the control tachycardia."

The rate of infusion of test compound is then increased, in geometric progression, such that test compound is administered for successive periods of 30 minutes at each rate, and isoprenaline-induced tachycardia is again measured as described above, until a dose is reached which causes a 75 percent inhibition of the control tachycardia. The percentage inhibition of control tachycardia is then plotted graphically against the logarithm of the total amount of test compound infused during the 30 minutes immediately preceding the measurement of each tachycardia, and that dose which, when infused during 30 minutes produces a 50 percent inhibition of the control tachycardia, is determined from the graph. This dose, which is designated the $ED_{50}$ and is recorded in $\mu$g./kg. bodyweight, is taken as a measure of the $\beta$-adrenergic blocking activity of the test compound. The $ED_{50}$ doses of various alkanolamine derivatives are recorded hereinafter in Tables 1 to 8.

Many of the alkanolamine derivatives used as active ingredient in the composition of the invention possess selective $\beta$-adrenergic blocking activity. Compounds exhibiting this selective action show a greater degree of specificity in blocking the cardiac $\beta$-receptors than the $\beta$-receptors in peripheral blood vessels and bronchial muscle. These compounds may be distinguished by their failure to affect the transient fall in blood pressure caused by the injection of isoprenaline in the experimental procedure described above at a dose which causes a 50 percent inhibition of the control tachycardia. Thus a dose may be selected for such a selective compound at which the compound blocks the cardiac chronotropic action of a catecholamine such as isoprenaline but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways diseases, inasmuch as the selective compound will substantially inhibit the unwanted stimulatory effects of the bronchodilator on the heart but will not hinder the desirable therapeutic effect of the bronchodilator.

The pharmaceutical composition of the invention may contain, in addition to the alkanolamine derivative, one or more drugs selected from sedatives, for example phenobarbitone, meprobamate and chlorpromazine; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; agents used in the treatment of Parkinson's disease, for example benzhexol; and cardiotonic agents, for example digitalis preparations. A pharmaceutical composition which contains an alkanolamine derivative which possesses selective $\beta$-adrenergic blocking properties as stated above may additionally contain a sympathomimetic bronchodilator, for example isoprenaline, orciprenaline, adrenaline or ephedrine.

According to a further feature of the invention there is provided a method for effecting coronary $\beta$-adrenergic blockade in a warm-blooded animal, including man, in need of such blockade, which comprises administering to said animal an effective amount of an alkanolamine derivative or ester or aldehyde condensation product or salt thereof as defined as an active ingredient of the pharmaceutical composition of the invention.

According to a further feature of the invention there is provided a method for treating angina pectoris, cardiac arrhythmias, hypertension or phaeochromocytoma in man which comprises administering to man an effective amount of an alkanolamine derivative or ester or aldehyde condensation product or salt thereof as defined as an active ingredient of the pharmaceutical composition of the invention.

According to a further feature of the invention there is provided a method for treating asthma and other obstructive airways diseases in a warm-blooded animal, including man, which comprises administering concomitantly, as hereinafter defined, to said animal:
i. an effective amount of at least one alkanolamine derivative or ester or aldehyde condensation product or salt thereof as defined as an active ingredient of the pharmaceutical composition of the invention which possesses selective $\beta$-adrenergic blocking activity; and
ii. an effective amount of at least one sympathomimetic bronchodilator.

Use of the expression "administering concomitantly" indicates that the two (or more) active agents are either administered simultaneously, by the same or different routes, or they are administered at an appropriate time interval so that the patient derives the maximum advantage from the combined therapy. Such a time interval is readily ascertainable by an expert in the field. Thus, for example, if the agents are to be administered simultaneously, this can be done by administering a combination formulation containing both active ingredients, or by simultaneously administering formulations of the two or more active agents by the same or different routes. Alternatively, if there is to be a time interval between the administration of the two or more agents, said agents can be administered in suitable formulations at appropriate times. Thus, for example, a formulation of a selective $\beta$-adrenergic blocking agent can be administered at an appropriate time interval before administering a formulation of a sympathomimetic bronchodilator.

The preferred compounds for use as active ingredient in the pharmaceutical composition of the invention, or for use in the method of the invention for effecting coronary $\beta$-adrenergic blockade, or for the treatment of angina pectoris, cardiac arrhythmias, hypertension or phaeochromocytoma, or for use, together with a sympathomimetic bronchodilator, in the method of the invention for the treatment of asthma, are the alkanolamine derivative 1-(4-acetamidophenoxy)-3-isopropylamino-2-propanol and non-toxic, pharmaceutically-acceptable acid-addition salts thereof, particularly the hydrochloride thereof. The next most preferred compounds are the alkanolamine derivative 1-(2-nitro-4-propionamidophenoxy)-3-t-butylamino-2-propanol and the non-toxic, pharmaceutically-acceptable acid-addition salts thereof.

Combination formulations for the treatment of asthma form a further feature of the invention, and these will contain a selective $\beta$-adrenergic blocking agent, preferably 1-(4-acetamidophenoxy)-3-isopropylamino-2-propanol or a non-toxic, pharmaceutically acceptable acid-addition salt thereof, and a sympathomimetic bronchodilator, preferably isoprenaline, orciprenaline, adrenaline or ephedrine or a non-toxic, pharmaceutically acceptable acid-addition salt thereof, and the type of formulation used in the combination compositions of the invention will depend upon the conventional mode of administration of the particular bronchodilator used. Also, the relative amounts of the selective $\beta$-adrenergic blocking agent and the sympathomimetic bronchodilator used will depend on the relative potencies of the specific compounds.

All four of the specifically mentioned bronchodilators are conventionally administered parenterally, particularly for the relief of status asthmaticus, usually subcutaneously but sometimes intramuscularly and in emergencies intravenously. Preferred combination compositions for parenteral administration comprise sterile aqueous solutions containing an acid-addition salt of a selective $\beta$-adrenergic blocking agent, preferably 1-(4-acetamidophenoxy)-3-isopropylamino-2-propanol hydrochloride or citrate, together with an acid-addition salt of a bronchodilator selected from isoprenaline, orciprenaline, adrenaline and ephedrine, preferably isoprenaline hydrochloride, isoprenaline sulphate, orciprenaline sulphate, adrenaline acid tartrate, ephedrine hydrochloride or ephedrine sulphate. The compositions for parenteral use may also contain conventional stabilising agents and preservatives. Conventional parenteral doses per patient for the four specifically-mentioned bronchodilators are:

| | |
|---|---|
| isoprenaline salts | about 0.06 mg. as an 0.02% w/v solution |
| orciprenaline salts | about 0.5 mg. as an 0.05% w/v solution |
| adrenaline salts | 0.4 to 1 mg. as an 0.1% w/v solution |
| ephedrine salts | 15 to 60 mg. as a 2.5% w/v solution |

Combination compositions in the form of sterile aqueous solutions containing the selective $\beta$-adrenergic blocking agent 1-(4-acetamidophenoxy)-3-isopropylamino-2-propanol together with one of the said bronchodilators will contain 500 to 1000 parts by weight of the $\beta$-adrenergic blocking agent for each part by weight of an isoprenaline salt, or 50 to 100 parts by weight for each part by weight of an orciprenaline salt, or 100 to 500 parts by weight for each part by weight of an adrenaline salt, or 2 to 10 parts by weight for each part by weight of an ephedrine salt, the solutions finally containing between 0.01 and 0.1 percent w/v of the isoprenaline, orciprenaline or adrenaline salt or between 0.5 and 5 percent w/v of the ephedrine salt.

Isoprenaline is also conventionally administered either in the form of sublingual tablets or by inhalation. When administered in such a form the compound is rapidly metabolized in the body and only a small proportion of the administered dose reaches the heart. Accordingly, the amount of selective $\beta$-adrenergic blocking agent, which is not rapidly metabolized, required for each part of isoprenaline is less than when the compounds are administered parenterally. Preferred combination compositions of the invention will contain 5 to 20 parts by weight of 1-(4-acetamidophenoxy)-3-isopropylamino-2-propanol or an acid-addition salt thereof for each part by weight of an isoprenaline salt in an inhalation composition or in a sublingual tablet composition, said tablets containing between 5 and 50, and preferably 5,10 or 20 mg. of isoprenaline. Similarly, preferred compositions of the invention may contain 5 to 20 parts by weight of 1-(4-acetamidophenoxy)-3-isopropylamino-2-propanol or an acid-addition salt thereof for each part by weight of orciprenaline in the form of inhalation compositions.

Orciprenaline and ephedrine are also conventionally administered orally in the form of tablets or capsules to be swallowed, or in the form of syrups or elixirs. Preferred combination compositions of the invention are oral compositions of the above type containing 2 to 10 parts by weight of 1-(4-acetamidophenoxy)-3-isopropylamino-2-propanol for each part by weight of an ephedrine salt, or 5 to 20 parts by weight of 1-(4-acetamidophenoxy)-3-isopropylamino-2-propanol for each part by weight of an orciprenaline salt, and of these particularly preferred compositions of the invention are tablets or capsules containing between 20 and 100 mg. of ephedrine hydrochloride or sulphate or between 5 and 50 mg. of orciprenaline sulphate together with the appropriate amount of 1-(4-acetamidophenoxy)-3-isopropylamino-2-propanol.

The combination compositions of the invention may additionally contain one or more additional drugs selected from bronchodilators of the xanthine type, for example aminophylline and theophylline; hypnotics of the barbiturate type, for example phenobarbitone or amylobarbitone; antihistamines, for example diphenhydramine; corticosteroids, for example cortisone, prednisolone and paramethasone; and atropine. In particular, an oral composition containing an ephedrine salt may with advantage additionally contain a xanthine type bronchodilator and a barbiturate, and an inhalant composition may with advantage additionally contain an antihistamine or atropine (preferably as the methonitrate), as used in conventional bronchodilator-containing compositions.

The combination compositions of the invention will be administered to man at such a dose that the conventionally used amount of the bronchodilator is administered.

A preferred method for the treatment of asthma according to this invention comprises the regular daily oral administration of at least one selective $\beta$-adrenergic blocking agent as defined above, and in particular 1-(4-acetamidophenoxy)-3-isopropylamino-2-propanol or a non-toxic, pharmaceutically acceptable acid-addition salt thereof, together with the administration of a sympathomimetic bronchodilator by conventional means, for example subcutaneously or intramuscularly, or sublingually or, preferably, by aerosol, as and when desired.

The preferred compound of the invention, 1-(4-acetamidophenoxy)-3-isopropylamino-2-propanol, which is also known under the non-proprietary name practolol, has been extensively examined in humans. Practolol is an effective $\beta$-adrenergic blocking agent in man, as demonstrated by its ability to cause a significant reduction in tachycardia induced by exercise or by isoprenaline or adrenaline in healthy volunteers (Brick et alia, Brit. J. Pharmacol., 1968, 34, 127–140).

Practolol is effective in the treatment of angina pectoris, in that it causes
i. a decrease in the frequency of anginal attacks;
ii. a decrease in the requirement for glyceryl trinitrate, which is commonly used to produce symptomatic relief of angina pectoris;
iii. an improvement in exercise tolerance; and
iv. an improvement in S-T depression shown on an electrocardiogram, which is believed to indicate the amount of ischaemia present, both when the patient is at rest and when the patient is taking exercise. (George et alia, Brit. Med. J., 1970, 2, 402;

Areskog and Adolfsson; Brit. Med. J., 1969, 2, 601-603; Sowton et alia; Amer. J. Med., 1970, in press).

Practolol is effective in the treatment of cardiac arrhythmias arising from a variety of causes, and in particular it is effective in the treatment of post-infarct arrhythmias and of arrhythmias caused by the administration of anaesthetics. (Johnstone, Brit. J. Anaesth., 1969, 41, 29-37; Gent et alia, Brit. Med. J. 1970, 1, 533-535). It may be administered in order to prevent the arrhythmia from occurring, or to restore normal rhythm when arrhythmia has occurred.

Practolol is effective in the treatment of essential and renal hypertension, in that it reduces raised blood pressures of the above types towards normal by a statistically significant amount (Leishman, Brit. Med. J., in press).

Practolol is cardioselective in that at doses which inhibit the effects of catecholamines on the $\beta$-receptors of the myocardium there is no clinically significant effect on the $\beta$-receptors of the bronchi or of the peripheral vasculature (Palmer et alia, Lancet, 1969, ii, 1092–1094; Shinebourne et alia, Cardiovascular Res., 1968, 4, 379–383).

It is recommended that, in the treatment of warm-blooded animals, the alkanolamine derivative defined as an active ingredient of the pharmaceutical composition of the invention be administered orally at a dose of between 0.25 and 10 mg. per kg. bodyweight daily, or at an intravenous dose of between 0.01 and 0.25 mg. per kg. bodyweight daily. In particular, when used in the treatment of man, it is recommended that the preferred compound of the invention, 1-(4-acetamidophenoxy)-3-isopropylamino-2-propanol, should be given to man for the treatment or prophylaxis of angina pectoris, or for the treatment of hypertension, or as an adjunct to the use of a sympathomimetic bronchodilator, at a total daily oral dose of between 100 mg. and 1200 mg., and for the treatment of cardiac arrhythmias and phaeochromocytoma at a total daily oral dose of between 100 mg. and 400 mg. Alternatively, an intravenous dose of between 5 mg. and 25 mg. may be used. The compounds will normally be administered orally two or three times per day, the doses being spaced at 6-8 hourly intervals. Preferred oral dosage forms are tablets or capsules containing between 25 mg. and 200 mg. of active ingredient, and more particularly containing 50 mg. or 100 mg. of active ingredient. Preferred intravenous dosage forms are sterile aqueous solutions of non-toxic acid-addition salts of the alkanolamine derivatives or esters or aldehyde-condensation products thereof, containing between 0.05 percent and 1 percent w/v of active ingredient, and more particularly containing 0.2 percent w/v of active ingredient.

Compounds hereinafter described in Tables 1 to 8 other than 1-(4-acetamidophenoxy)-3-isopropylamino-2-propanol (practolol) are recommended for use in the treatment of man at doses calculated by reference to the relative $ED_{50}$ doses of the compound and of practolol, and to the doses recommended above for practolol.

The invention is illustrated but not limited by the following Examples in which the parts are by weight:-

EXAMPLE 1

A mixture of 100 parts of 1-(4-acetamidophenoxy)-

3-isopropylamino-2-propanol, 25 parts of ephedrine hydrochloride and 75 parts of mannitol is filled into hard gelatine capsules such that each capsule contains 200 mg. of the mixture. There are thus obtained capsules which are suitable for oral administration to man for therapeutic purposes.

EXAMPLE 2

A 5 percent aqueous solution containing 5 parts of gelatin is added to a mixture of 100 parts of 1-(4-acetamidophenoxy)-3-isopropylamino-2-propanol, 30 parts of ephedrine hydrochloride, 100 parts of lactose, 40 parts of calcium phosphate and 50 parts of maize starch, the resulting mixture is compressed and the compressed material is passed through a 16 mesh screen. The granules are dried and passed through a 16 mesh screen, 3 parts of magnesium stearate are added and the mixture is compressed into tablets which are suitable for oral administration to man for therapeutic purposes.

EXAMPLE 3

The process described in Example 2 is repeated except that 3 parts of gelatin, 200 parts of 1-(4-acetamidophenoxy)-3-isopropylamino-2-propanol, 20 parts of orciprenaline sulphate, 42 parts of lactose, 100 parts of calcium phosphate, 125 parts of maize starch and 10 parts of magnesium stearate are used as ingredients. There are thus obtained tablets weighing 500 mg. which are suitable for oral administration to man for therapeutic purposes.

EXAMPLE 4

A 5 percent aqueous solution containing 2 parts of gelatin is added to a mixture of 11 parts of ephedrine hydrochloride, 8 parts of phenobarbitone, 120 parts of theophylline, 44 parts of 1-(4-acetamidophenoxy)-3-isopropylamino-2-propanol and 141.5 parts of lactose, the resulting mixture is compressed and the compressed material is passed through a 16 mesh screen. The granules are dried and passed through a 16 mesh screen, 3.5 parts of magnesium stearate and 20 parts of maize starch are added and the mixture is compressed into tablets. There are thus obtained tablets weighing 370 mg. which are suitable for oral administration to man for therapeutic purposes.

EXAMPLE 5

A 5 percent aqueous solution containing 2 parts of gelatin is added to a mixture of 100 parts of 1-(4-acetamidophenoxy)-3-isopropylamino-2-propanol, 10 parts of isoprenaline hydrochloride, 136 parts of lactose, 0.1 part of sodium metabisulphite and 0.1 part of citric acid, the resulting mixture is compressed and the compressed material is passed through a 16 mesh screen. The granules are dried and passed through a 16 mesh screen, 2 parts of magnesium stearate are added and the mixture is compressed into tablets. There are thus obtained tablets weighing 250 mg. which are suitable for sublingual administration to man for therapeutic purposes.

EXAMPLE 6

A solution of 0.05 part of orciprenaline sulphate, 4 parts of 1-(4-acetamidophenoxy)-3-isopropylamino-2-propanol and 0.1 part of sodium metabisulphite in 96 parts of water for injection is passed through a sterilising filter. The sterile filtrate is filled into sterile ampoules under aseptic conditions and there is thus obtained a sterile injectable solution suitable for parenteral administration to man for therapeutic purposes.

EXAMPLE 7

A solution of 0.006 part of isoprenaline sulphate, 4 parts of 1-(4-acetamidophenoxy)-3-isopropylamino-2-propanol, 1.5 parts of citric acid and 0.1 part of sodium metabisulphite in 95 parts of water for injection is adjusted to pH 6 with sodium citrate, and is then passed through a sterilising filter. The sterile filtrate is filled into sterile ampoules under aseptic conditions and there is thus obtained a sterile injectable solution suitable for parenteral administration to man for therapeutic purposes.

EXAMPLE 8

The process described in Example 5 is repeated except that 114 parts of 1-(4-acetamidophenoxy)-3-isopropylamino-2-propanol hydrochloride are used in place of the 100 parts of 1-(4-acetamidophenoxy)-3-isopropylamino-2-propanol, and that 122 parts of lactose are used in place of 136 parts of lactose. There are thus obtained tablets weighing 250 mg. which are suitable for sublingual administration to man for therapeutic purposes.

EXAMPLE 9

25 Parts of 1-(4-acetamidophenoxy)-3-isopropylamino-2-propanol, 65.5 parts of lactose and 7.5 parts of maize starch are mixed with 1 part of a 10 percent aqueous solution of gelatin to form a stiff paste. The paste is passed through a 16-mesh screen, dried at 60°C. to constant weight, and then passed through a 20-mesh screen. To the resultant granules is added 1 part of magnesium stearate and the mixture is compressed into tablets according to the known art. These are thus obtained tablets each weighing 100 mg. and each containing 25 mg. of active ingredient, which are suitable for oral administration to man for therapeutic purposes.

EXAMPLE 10

A mixture of 50 parts of 1-(4-acetamidophenoxy)-3-isopropylamino-2-propanol, 91 parts of spray-dried lactose and 7.5 parts of maize starch is passed through a 60-mesh screen, 1 part of magnesium stearate is added and the mixture is compressed into tablets according to the known art. There are thus obtained tablets each weighing 150 mg. and each containing 50 mg. of active ingredient, which are suitable for oral administration to man for therapeutic purposes.

EXAMPLE 11

0.1 Part of 1-(4-acetamidophenoxy)-3-isopropylamino-2-propanol and 0.1 part of citric acid are dissolved in 95 parts of distilled water. Sodium citrate is added until the pH of the solution is 6, water is added to make up 100 parts by volume, and the mixture is filtered. The filtrate is filled into ampoules which are sealed and heated at 115°C. for 30 minutes. There are thus obtained ampoules containing a sterile aqueous solution suitable for parenteral administration to man for therapeutic purposes.

EXAMPLE 12

A mixture of 25 parts of 1-(4-acetamidophenoxy)-3-isopropylamino-2-propanol and 75 parts of mannitol is filled into hard gelatin capsules each containing 25 mg. of active ingredient, which are then suitable for oral administration to man for therapeutic purposes.

EXAMPLE 13

A mixture of 0.5 part of 1-(4-methanesulphonamidophenoxy)-3-(N-benzylisopropylamino)-2-propanol, 0.3 part of 5 percent palladium-on-charcoal catalyst and 20 parts of ethanol is shaken with hydrogen at a pressure of 100 atmospheres and at ambient temperature until uptake of hydrogen ceases. The mixture is filtered and the filtrate is evaporated to dryness under reduced pressure. The residue is crystallised from a mixture of ethyl acetate and petroleum ether (b.p. 60°–80°C.), and there is thus obtained 1-(4-methanesulphonamidophenoxy)-3-isopropylamino-2-propanol, m.p. 126°–128°C.

The 1-(4-methanesulphonamidophenoxy)-3-(N-benzylisopropylamino)-2-propanol used as starting material may be obtained as follows:-

A mixture of 21 parts of 1-(4-nitrophenoxy)-2,3-epoxypropane and 14.9 parts of N-benzylisopropylamine is heated at 100°C. for 2 hours. The mixture is then dissolved in 100 parts of ethyl acetate and acidified with ethereal hydrogen chloride solution. The mixture is filtered and the solid residue is washed with ethyl acetate. There is thus obtained 1-(4-nitrophenoxy)-3-(N-benzylisopropylamino)-2-propanol hydrochloride, m.p. 147°–148°C. 11.4 Parts of this salt are added to a rapidly stirred mixture of 30 parts of iron powder, 120 parts of ethanol and 0.5 part of concentrated hydrochloric acid heated to reflux temperature. The mixture is stirred and heated under reflux for 4 hours, 0.5 part of concentrated hydrochloric acid being added after the first hour. To the mixture there is then added 4 parts of aqueous 10N-sodium hydroxide solution and the hot mixture is filtered. The filtrate is evaporated to dryness under reduced pressure and the residue is distilled. There is thus obtained 1-(4-aminophenoxy)-3-(N-benzylisopropylamino)-2-propanol, b.p. 198°–200°C./0.15 mm. To a stirred mixture of 2.5 parts of this compound in 40 parts of ether there is added, at 15°C., a mixture of 0.84 part of methanesulphonyl chloride in 20 parts of ether. The mixture is stirred for 2 hours and the ethereal layer is then decanted and evaporated to dryness under reduced pressure. The residue is dissolved in 20 parts of water, the pH of the solution is adjusted to 7 and the solution is extracted with 15 parts of ethyl acetate. The extract is dried with anhydrous magnesium sulphate and filtered and to the filtrate there are added 5 parts of petroleum ether (b.p. 60°–80°C.). The solid which is precipitated is collected by filtration and crystallised from a mixture of ethyl acetate and petroleum ether (b.p. 60°–80°C.). There is thus obtained 1-(4-methanesulphonamidophenoxy)-3-(N-benzylisopropylamino)-2-propanol, m.p. 112°–114°C.

EXAMPLE 14

A mixture of 2 parts of 1-(4-acetamidophenoxy)-2,3-epoxypropane and 10 parts of isopropylamine is stirred at ambient temperature for 16 hours. The resulting solution is evaporated to dryness under reduced pressure and the residue is crystallised from butyl acetate. There is thus obtained 1-(4-acetamidophenoxy)-3-isopropylamino-2-propanol, m.p. 141°C.

The above base is dissolved in warm isopropanol and to the solution is added an excess of ethereal hydrogen chloride solution. The mixture is cooled and filtered, and the solid product is washed with ether and dried. There is thus obtained 1-(4-acetamidophenoxy)-3-isopropylamino-2-propanol hydrochloride monohydrate, m.p. 140°–142°C.

The 1-(4-acetamidophenoxy)-2,3-epoxypropane used as starting material may be obtained as follows:-

To a solution of 4.5 parts of 4-acetamidophenol and 1.5 parts of sodium hydroxide in 50 parts of water at 15°C. there is added 3.5 parts of epichlorohydrin. The mixture is stirred for 16 hours at ambient temperature, filtered and the solid residue is washed with water. There is thus obtained 1-(4-acetamidophenoxy)-2,3-epoxypropane, m.p. 110°C.

EXAMPLE 15

A mixture of 4.5 parts of 1-(2-ethyl-4-propionamidophenoxy)-3-chloropropan-2-ol and 40 parts of t-butylamine is heated in a sealed vessel at 100°C. for 10 hours and the excess of t-butylamine is then removed from the mixture by evaporation under reduced pressure. The residue is shaken with a mixture of ethyl acetate and water, and the organic phase is separated and dried over magnesium sulphate. The dried solution is evaporated to dryness under reduced pressure and the solid residue is triturated with acetone. There is thus obtained 1-(2-ethyl-4-propionamidophenoxy)-3-t-butylaminopropan-2-ol, m.p. 146°C.

The 1-(2-ethyl-4-propionamidophenoxy)-3-chloropropan-2-ol used as starting material may be obtained as follows:-

A mixture of 3 parts of 4-amino-2-ethylphenol, 30 parts of propionic anhydride and 30 parts of water is heated and stirred at 100°C. for 1 hour. The mixture is evaporated to dryness under reduced pressure and the solid residue is crystallised from ethyl acetate. There is thus obtained 2-ethyl-4-propionamidophenol, m.p. 152°C.

A mixture of 6 parts of 2-ethyl-4-propionamidophenol, 80 parts of epichlorohydrin and 1 part of piperidine is heated at 100°C. for 6 hours. The excess of epichlorohydrin is removed from the reaction mixture by evaporation under reduced pressure and there is thus obtained 1-(2-ethyl-4-propionamidophenoxy)-3-chloropropan-2-ol as an oil.

EXAMPLE 16

A mixture of 0.5 part of 1-(2-bromo-4-propionamidophenoxy)-3-isopropylamino-2-propanol and 10 parts of acetyl chloride is heated under reflux for 2 hours. The mixture is evaporated to dryness under reduced pressure and the residue is crystallised from a mixture of 5 parts of acetone and 5 parts of ether. There is thus obtained 2-(2-bromo-4-propionamidophenoxy)-1-(isopropylaminomethyl)ethyl acetate hydrochloride, m.p. 124°–126°C.

EXAMPLE 17

A mixture of 0.5 part of 1-(2-benzyloxy-4- propionamidophenoxy)-3-isopropylamino-2-propanol, 2 parts of a 36 percent weight/volume aqueous solution of formaldehyde and 25 parts of ethanol is heated under reflux for 6 hours. The mixture is evaporated to dryness under reduced pressure, the residue is dissolved in 10 parts of ethyl acetate and an excess of ethereal hydrogen chloride is added. The mixture if filtered and the solid residue is crystallised from isopropanol. There is thus obtained 5-(2-benzyloxy-4-propionamidophenoxymethyl)-3-isopropyloxazolidine hydrochloride, m.p. 180°–182°C.

The compounds described in the following Tables 1 to 8 may be obtained by similar processes to those described in Examples 13 to 17 above:

TABLE 1

Compounds of the general formula:

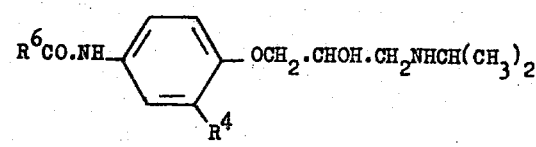

| $R^4$ | $R^6$ | m.p.(°C.) | $ED_{50}(\mu g./kg.)$ |
|---|---|---|---|
| hydrogen | hydrogen | dihydrate, 189–192 | 750 |
| hydrogen | methyl | 141 | 167 |
| hydrogen | ethyl | 135–137 | 75 |
| hydrogen | n-propyl | 127–128 | 138 |
| hydrogen | n-pentyl | 136–138 | 99 |
| hydrogen | phenyl | 172–174 | 161 |
| hydrogen | p-tolyl | 176 | 75 |
| hydrogen | p-chlorophenyl | 178–180 | 117 |
| hydrogen | cyclohexyl | 159–161 | 660 |
| hydrogen | m-nitrophenyl | 162–164 | 600 |
| hydrogen | p-acetamidophenyl | 210–212 | 660 |
| hydrogen | vinyl | 127–132 | 201 |
| hydrogen | hydroxymethyl | 125–128 | 360 |
| hydrogen | chloromethyl | 146–148 | 105 |
| hydrogen | ethoxy | 102–103 | 742 |
| hydrogen | cyclopropyl | 159–160 | 75 |
| hydrogen | phenoxymethyl | hydrochloride, 168–170 | 180 |
| hydrogen | benzyl | 138–140 | 65 |
| hydrogen | 2-furyl | 138–141 | 195 |
| fluorine | methyl | 122–123 | 360 |
| fluorine | ethyl | (oil) | 15 |
| chlorine | methyl | 141.5–142 | 174 |
| chlorine | ethyl | 146–147 | 131 |
| bromine | methyl | 142–144 | 66 |
| bromine | ethyl | 147–148 | 72 |
| bromine | n-butyl | 124 | 120 |
| bromine | n-hexyl | 130–132 | 135 |
| iodine | ethyl | 160 | 11 |
| hydroxy | methyl | 134–136 | 510 |
| hydroxy | ethyl | 148–149 | 300 |
| nitro | methyl | 132–134 | 285 |
| nitro | ethyl | 134–135.5 | 150 |
| methyl | methyl | 136–139 | 249 |
| methyl | ethyl | 142 | 171 |
| methyl | t-butyl | 88 | 222 |
| methyl | phenyl | 170 | 90 |
| methyl | p-tolyl | 165 | 66 |
| ethyl | methyl | 134–136 | 111 |
| ethyl | ethyl | 136–137 | 108 |
| ethyl | n-propyl | 132 | 36 |
| ethyl | isopropyl | 140 | 168 |
| ethyl | t-butyl | hydrochloride, 222 | 156 |
| ethyl | phenyl | 134 | 48 |
| ethyl | p-tolyl | 138 | 36 |
| ethyl | o-chlorophenyl | hydrochloride, 200 | 180 |
| ethyl | p-chlorophenyl | 162 | 45 |
| n-propyl | methyl | 137–138 | 42 |
| n-propyl | ethyl | 134–135 | 72 |
| n-propyl | n-hexyl | 127–128 | 56 |
| n-propyl | n-nonyl | 112–113 | 420 |
| n-butyl | ethyl | 111–112 | 72 |
| s-butyl | ethyl | (oil) | 300 |
| t-butyl | methyl | hydrochloride, 228–232 | 183 |
| methoxymethyl | ethyl | 129–130 | 186 |
| benzyl | ethyl | 134 | 219 |
| α-methylbenzyl | ethyl | 104–106 | 150 |
| benzyloxy | ethyl | 136–138 | 150 |
| phenyl | methyl | 155–156 | 60 |
| phenyl | ethyl | 115–116 | 84 |
| p-tolyloxy | ethyl | 88 | 132 |
| p-tolyoxy | n-propyl | 88 | 300 |
| cyclohexyl | ethyl | picrate, 216 | 198 |
| methoxy | ethyl | 129–130 | 75 |
| ethoxy | ethyl | 144–146 | 150 |
| allyloxy | methyl | 124–126 | 120 |
| allyloxy | ethyl | 128–130 | 195 |
| allyl | ethyl | 124–126 | 69 |
| methylthio | methyl | 142–144 | 280 |
| propionyl | ethyl | 92 | 300 |

TABLE 2

Compounds of the general formula:

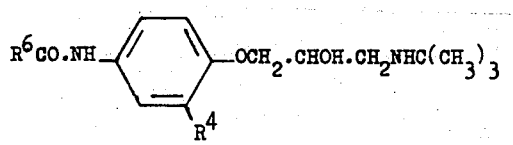

| R⁴ | R⁶ | m.p.(°C.) | ED₅₀(μg./kg.) |
|---|---|---|---|
| hydrogen | methyl | 126 | 134 |
| hydrogen | ethyl | 99–101.5 | 87 |
| hydrogen | n-propyl | hydrogen oxalate, 227–228.5 | 125 |
| hydrogen | isopropyl | 96–98 | 119 |
| hydrogen | n-butyl | 100–102 | 84 |
| fluorine | ethyl | 108–110 | 90 |
| chlorine | methyl | 97–99 | 69 |
| chlorine | ethyl | 139.5–141 | 39 |
| bromine | ethyl | hydrochloride, 200–202 | 11 |
| bromine | n-propyl | hydrochloride, 190–192 | 66 |
| bromine | n-pentyl | 96 | 81 |
| iodine | ethyl | hydrochloride, 220 | 6 |
| nitro | ethyl | 112–114 | 30 |
| cyano | ethyl | oxalate hemihydrate 187–190 | 45 |
| trifluoromethyl | ethyl | hydrochloride, 210–214 | 15 |
| methyl | ethyl | 148 | 27 |
| methyl | t-butyl | hydrochloride, 230 | 255 |
| methyl | p-tolyl | 130 | 57 |
| ethyl | methyl | 130–133 | 30 |
| ethyl | ethyl | 146 | 24 |
| ethyl | n-propyl | 98 | 22 |
| ethyl | isopropyl | hydrochloride, 216 | 81 |
| ethyl | n-butyl | 84 | 12 |
| ethyl | t-butyl | oxalate, 230(d) | 69 |
| ethyl | phenyl | hydrochloride, 194–198 | 28 |
| ethyl | p-tolyl | hydrochloride, 216 | 54 |
| ethyl | o-chlorophenyl | hydrochloride, 210 | 114 |
| ethyl | p-t-butylphenyl | (oil) | 300 |
| ethyl | vinyl | hydrate, 137–140 | 102 |
| ethyl | 1-propenyl | (oil) | 33 |
| ethyl | styryl | 137.5–140 | 30 |
| n-propyl | ethyl | 134–137 | 15 |
| n-propyl | n-propyl | 116.5–118 | 42 |
| n-propyl | chloromethyl | 130–132 | 57 |
| n-propyl | cyclopropyl | 155–158 | 30 |
| isopropyl | ethyl | (oil) | 10 |
| isopropyl | p-tolyl | hydrogen oxalate hemihydrate, 225–227 | 87 |
| n-butyl | ethyl | 90–92 | 22 |
| s-butyl | ethyl | (oil) | 75 |
| t-butyl | ethyl | (oil) | 63 |
| t-pentyl | ethyl | (oil) | 60 |
| benzyl | ethyl | hydrochloride, 246 | 42 |
| α-methylbenzyl | ethyl | hydrochloride, 222–224 | 120 |
| benzyloxy | ethyl | (oil) | 18 |
| phenoxy | ethyl | hydrochloride, 188–189 | 60 |
| hydroxymethyl | ethyl | 161–164 | 33 |
| methoxy | ethyl | 149–150 | 60 |
| ethoxy | ethyl | 148–150 | 36 |
| allyloxy | ethyl | 108 | 60 |
| allyl | ethyl | 148–151 | 30 |
| methylthio | ethyl | 148–150 | 22 |
| methoxycarbonyl | ethyl | 143–145 | 72 |

TABLE 3

Compounds of the general formula:

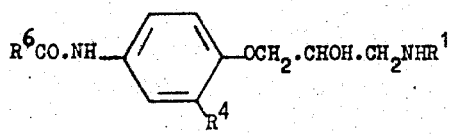

| R¹ | R⁴ | R⁶ | m.p.(°C.) | ED₅₀(μg./kg.) |
|---|---|---|---|---|
| 1-methylhexyl | hydrogen | methyl | hydrogen oxalate 111–112 | 219 |
| s-butyl | ethyl | ethyl | 108 | 150 |
| s-butyl | bromine | ethyl | 108 | 180 |
| 2-hydroxy-1,1-dimethylethyl | hydrogen | methyl | 116–118 | 262 |
| 2-hydroxy-1,1-dimethylethyl | ethyl | ethyl | 102–104 | 90 |
| 2-hydroxy-1,1-dimethylethyl | bromine | ethyl | 118 | 63 |
| cyclopentyl | ethyl | ethyl | 132–134 | 150 |
| cyclopentyl | bromine | ethyl | 124 | 330 |
| cyclopentyl | chlorine | methyl | 103–105 | 480 |
| 1-methyl-2-phenylethyl | hydrogen | methyl | 112–114 | 424 |
| 1,1-dimethyl-2-phenylethyl | chlorine | methyl | 114–117 | 570 |
| 1,1-dimethyl-2-phenylethyl | methyl | ethyl | picrate, 162–164 | 720 |
| 1-methyl-2-(p-methoxyphenyl)-ethyl | hydrogen | methyl | 117–118 | 349 |
| 1-methyl-3-phenylpropyl | hydrogen | methyl | 125–126 | 372 |

TABLE 4

Compounds of the general formula:

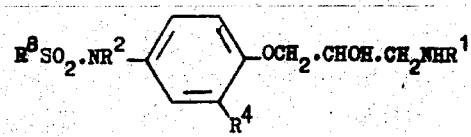

| R¹ | R² | R⁴ | R⁸ | m.p.(°C.) | ED₅₀(μg./kg.) |
|---|---|---|---|---|---|
| isopropyl | hydrogen | hydrogen | methyl | 126–128 | 150 |
| isopropyl | methyl | hydrogen | methyl | 96–98 | 579 |
| t-butyl | hydrogen | n-propyl | ethyl | 153–156 | 156 |
| isopropyl | hydrogen | hydrogen | phenyl | 130 | 420 |
| isopropyl | hydrogen | hydrogen | p-tolyl | 88–89 | 334 |

TABLE 5

Compounds of the general formula:

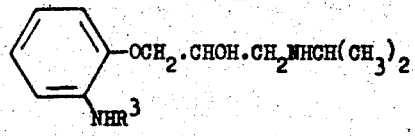

| R³ | m.p.(°C.) | ED₅₀(μg./kg.) |
|---|---|---|
| acetyl | 98–100 | 280 |
| methanesulphonyl | oxalate, 190–192(d) | 300 |

TABLE 6

Compounds of the general formula:

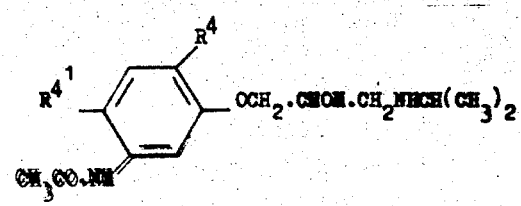

| R⁴ | R⁴¹ | m.p.(°C.) | ED₅₀(μg./kg.) |
|---|---|---|---|
| hydrogen | hydrogen | 99–101 | 804 |
| n-butyl | hydrogen | hemihydrate, 131–132 | 75 |
| hydrogen | acetamido | 130 | 210 |

TABLE 7

Esters of the general formula:

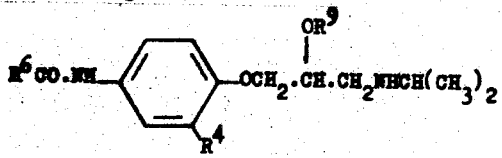

| R⁴ | R⁶ | R⁹ | m.p.(°C.) | ED₅₀(μg./kg.) |
|---|---|---|---|---|
| hydrogen | methyl | acetyl | hydrochloride, 134–136 | 450 |
| hydrogen | methyl | hexanoyl | oxalate, 151–153 | 150 |
| bromine | ethyl | acetyl | hydrochloride, 124–126 | 450 |
| methyl | ethyl | acetyl | hydrogen oxalate, 124 | 780 |

TABLE 8

Oxazolidines of the general formula:

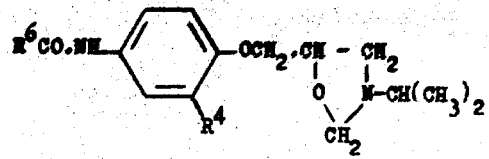

| R⁴ | R⁶ | m.p.(°C.) | ED₅₀(μg./kg.) |
|---|---|---|---|
| hydrogen | methyl | oil | 55 |
| bromine | ethyl | picrate, 170 | 135 |
| n-butyl | ethyl | picrate, 178–179 | 93 |
| benzyloxy | ethyl | hydrochloride, 180–182 | 195 |

EXAMPLE 18

50 Parts of 1-(4-acetamidophenoxy)-3-isopropylamino-2-propanol, 50 parts of lactose, 20 parts of calcium phosphate and 20 parts of maize starch are mixed and granulated with 1.5 parts of a 5 percent aqueous solution of gelatin to form a stiff paste. The paste is passed through a 16-mesh screen, dried at 60°C. to constant weight and then passed through a 20-mesh screen. To the granules are added 2.25 parts of magnesium stearate and 6.25 parts of maize starch and the mixture is compressed into tablets according to the known art. There are thus obtained tablets each weighing 150 mg. and each containing 50 mg. of active ingredient which are suitable for oral administration to man for therapeutic purposes.

EXAMPLE 19

0.2 Part of 1-(4-acetamidophenoxy)-3-isopropylamino-2-propanol, 0.3 part of citric acid and 0.15 part of sodium citrate are dissolved in 95 parts of water for injections. If necessary, the pH of the solution is adjusted to 6 by addition of a molar solution of sodium hydroxide in water for injections. Further water for injections is added to make up 100 parts by volume, and the mixture is filtered. The filtrate is filled into ampoules which are sealed and heated at 115°C. for 30 minutes. There are thus obtained ampoules containing a sterile aqueous solution suitable for parenteral administration to man for therapeutic purposes.

EXAMPLE 20

100 Parts of 1-(4-acetamidophenoxy)-3-isopropylamino-2-propanol, 45 parts of calcium phosphate, 44 parts of maize starch, 5 parts of pregelatinised starch and 2 parts of stearic acid are mixed and sufficient of a 70:30 w/v mixture of water and methylated spirit is added to form a paste suitable for granulation. The paste is passed through a 16-mesh screen and dried at 60°C. to constant weight, and 4 parts of magnesium stearate are added. The mixture is passed through a 20-mesh screen, reblended and compressed into tablets. There are thus obtained tablets each weighing 200 mg. and containing 100 mg. of active ingredient which are suitable for oral administration to man for therapeutic purposes.

The 1-(4-acetamidophenoxy)-3-isopropylamino-2-propanol (practolol) used as active ingredient in any of the abovementioned Examples 1 to 12 and 18 to 20 may be replaced by a similar amount of any of the compounds described in Tables 1 to 8.

What we claim is:

1. A pharmaceutical composition for β-adrenergic blocking which contains as active ingredient an effective β-adrenergic blocking amount of an alkanolamine derivative selected from the group consisting of compounds of the formula:-

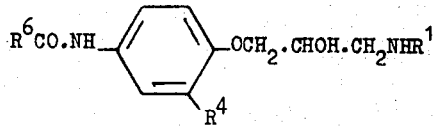

wherein $R^1$ is unsubstituted alkyl of up to 10 carbon atoms, unsubstituted cycloalkyl of up to 8 carbon atoms, or alkyl of up to 6 carbon atoms which is substituted by hydroxy, phenyl or methoxyphenyl; wherein $R^2$ is hydrogen or alkyl of up to 4 carbon atoms; wherein $R^3$ is alkanoyl of up to 10 carbon atoms, hydroxyalkanoyl, halogenoalkanoyl or alkoxycarbonyl each of up to 6 carbon atoms, alkanesulphonyl of up to 6 carbon atoms, alkenoyl of up to 6 carbon atoms, cycloalkanecarbonyl of up to 8 carbon atoms, phenylalkanoyl or phenoxyalkanoyl each of up to 10 carbon atoms, phenylalkenoyl of up to 10 carbon atoms, benzoyl, halogenobenzoyl, nitrobenzoyl, alkylbenzoyl of up to 12 carbon atoms, acylaminobenzoyl of up to 12 carbon atoms, furoyl, benzenesulphonyl or alkylbenzenesulphonyl of up to 10 carbon atoms; and wherein $R^4$ is hydrogen, halogen, hydroxy, nitro, cyano, acetamido, trifluoromethyl, alkyl of 1 to 10 carbon atoms, alkoxyalkyl of up to 10 carbon atoms, phenylalkyl or phenylalkoxy each of up to 10 carbon atoms, aryl or aryloxy each of up to 10 carbon atoms, cycloalkyl of up to 8 carbon atoms, hydroxyalkyl, alkoxy or alkylthio each of up to 5 carbon atoms, alkenyloxy or alkenyl each of up to 5 carbon atoms, or alkanoyl or alkoxycarbonyl each of up to 5 carbon atoms; and the non-toxic, pharmaceutically acceptable acid-addition salts thereof; said active ingredient being associated with a non-toxic, pharmaceutically acceptable or carrier therefor.

2. The composition as claimed in claim 1 wherein in the alkanolamine derivative used as active ingredient $R^1$ is alkyl of 3,4 or 5 carbon atoms which is branched at the α-carbon atom and which in unsubstituted or which bears one hydroxy or phenyl substituent attached to a carbon atom other than the α-carbon atom.

3. The pharmaceutical composition as claimed in claim 1 wherein the active ingredient is selected from the group consisting of compounds of the formula given in claim 1, wherein $R^1$ is isopropyl, s-butyl, t-butyl, cyclopropyl, cyclobutyl, cyclopentyl, 2-hydroxy-1,1-dimethylethyl, 1,1-dimethyl-2-phenylethyl, 1-methyl-2-phenylethyl, 1-methyl-3-phenylpropyl or 1-methyl-2-(p-methoxyphenyl)-ethyl, wherein $R^2$ is hydrogen or methyl, wherein $R^3$ is formyl, acetyl, propionyl, butyryl, isobutyryl, valeryl, pivaloyl, hexanoyl, heptanoyl, decanoyl, hydroxyacetyl, chloroacetyl, acryloyl, crotonoyl, ethoxycarbonyl, methane-sulphonyl, ethanesulphonyl, cyclopropanecarbonyl, cyclohexanecarbonyl, phenylacetyl, phenoxyacetyl, cinnamoyl, benzoyl, o-chlorobenzoyl, p-chlorobenzoyl, m-nitrobenzoyl, p-toluoyl, p-t-butylbenzoyl, p-acetamidobenzoyl, 2-furoyl, benzenesulphonyl or toluene-p-sulphonyl, and wherein $R^4$ is hydrogen, fluorine, chlorine, bromine, iodine, hydroxy, nitro, acetamido, trifluoro-methyl, methyl, ethyl, n-propyl, isopropyl, n-butyl, isobutyl, s-butyl, t-butyl, t-pentyl, 1-methylheptyl, methoxymethyl, benzyl, α-methylbenzyl, benzyloxy, phenyl, p-tolyl, phenoxy, p-tolyloxy, cyclohexyl, hydroxymethyl, methoxy, ethoxy, allyloxy, allyl, methylthio, ethylthio, acetyl, propionyl, methoxycarbonyl or ethoxycarbonyl; and the non-toxic, pharmaceutically acceptable hydrochloride or oxalate salts thereof.

4. The pharmaceutical composition as claimed in claim 1 wherein said active ingredient is selected from the group consisting of compounds of the formula:-

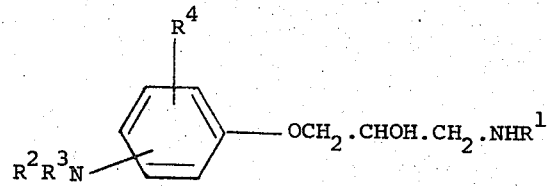

wherein $R^1$ is alkyl of 3,4 or 5 carbon atoms which is branched at the α-carbon atom and which is unsubstituted or which bears one hydroxy or phenyl substituent attached to a carbon atom other than the α-carbon atom, or $R^1$ is cycloalkyl of 3,4 or 5 carbon atoms; wherein $R^4$ has the meaning stated in claim 1; and wherein $R^6$ is alkyl of up to 6 carbon atoms, alkenyl of 2 or 3 carbon atoms, chloroacetyl, cyclopropyl, benzyl, styryl, phenyl, tolyl or monochlorophenyl; and the non-toxic pharmaceutically acceptable acid-addition salts thereof.

5. The pharmaceutical composition as claimed in claim 4 wherein $R^1$ is isopropyl or t-butyl and $R^4$ has the meaning stated in claim 3.

6. The pharmaceutical composition as claimed in claim 1 wherein the active ingredient is 1-(4-acetamidophenoxy)-3-isopropylamino-2-propanol or a non-toxic, pharmaceutically-acceptable acid-addition salt thereof.

7. The pharmaceutical composition as claimed in claim 1 wherein the active ingredient is 1-(2-nitro-4-propionamidophenoxy)-3-t-butylamino-2-propanol or a non-toxic, pharmaceutically-acceptable acid-addition salt thereof.

8. The pharmaceutical composition as claimed in claim 1 which is in the form of a tablet, capsule, aqueous or oily solution or suspension, emulsion, dispersible powder, granule, syrup, elixir, sterile injectable aqueous or oily solution or suspension, suppository, aerosol, spray or snuff.

9. A pharmaceutical composition which comprises a tablet containing a β-adrenergic blocking amount of between 25 mg. and 200 mg. of the compound 1-(4-acetamidophenoxy)-3-isopropylamino-2-propanol.

10. A pharmaceutical composition which comprises a sterile aqueous solution containing a β-adrenergic blocking amount of between 0.05 percent and 1 percent w/v of the compound 1-(4-acetamidophenoxy)-3-isopropylamino-2-propanol or a non-toxic, pharmaceutically acceptable acid-addition salt thereof.

11. A pharmaceutical composition which comprises, in combination, a cardioselective β-adrenergic blocking amount of an agent selected from the group consisting of 1-(4-acetamidophenoxy)-3-isopropylamino-2-propanol and the non-toxic, pharmaceutically acceptable acid-addition salts thereof and an effective amount of a sympathomimetic bronchodilator seclected from the group consisting of isoprenaline, orciprenaline, adrenaline and ephedrine and the non-toxic, pharmaceutically acceptable acid-addition salts thereof.

12. The pharmaceutical composition according to claim 11 which is in the form of a sterile injectable aqueous solution, a sublingual tablet or an inhalation composition.

13. A method for effecting coronary β-adrenergic blockade in a warm-blooded animal, in need of such blockade, which comprises administering to said animal an effective β-adrenergic blocking amount of an alkanolamine derivative or salt thereof as defined in claim 1.

14. The method according to claim 13 wherein the compound administered is 1-(4-acetamidophenoxy)-3-isopropylamino-2-propanol or a non-toxic, pharmaceutically-acceptable acid-addition salt thereof.

15. The method according to claim 14 wherein the compound administered is 1-(2-nitro-4-propionamidophenoxy)-3-t-butylamino-2-propanol or a non-toxic, pharmaceutically-acceptable acid-addition salt thereof.

* * * * *